Dec. 4, 1934.   J. A. SEITZ   1,983,317
COUPLING FOR TRAILERS
Filed March 27, 1933   2 Sheets-Sheet 1

INVENTOR.
Jacob A. Seitz
BY Bodell & Thompson
ATTORNEYS.

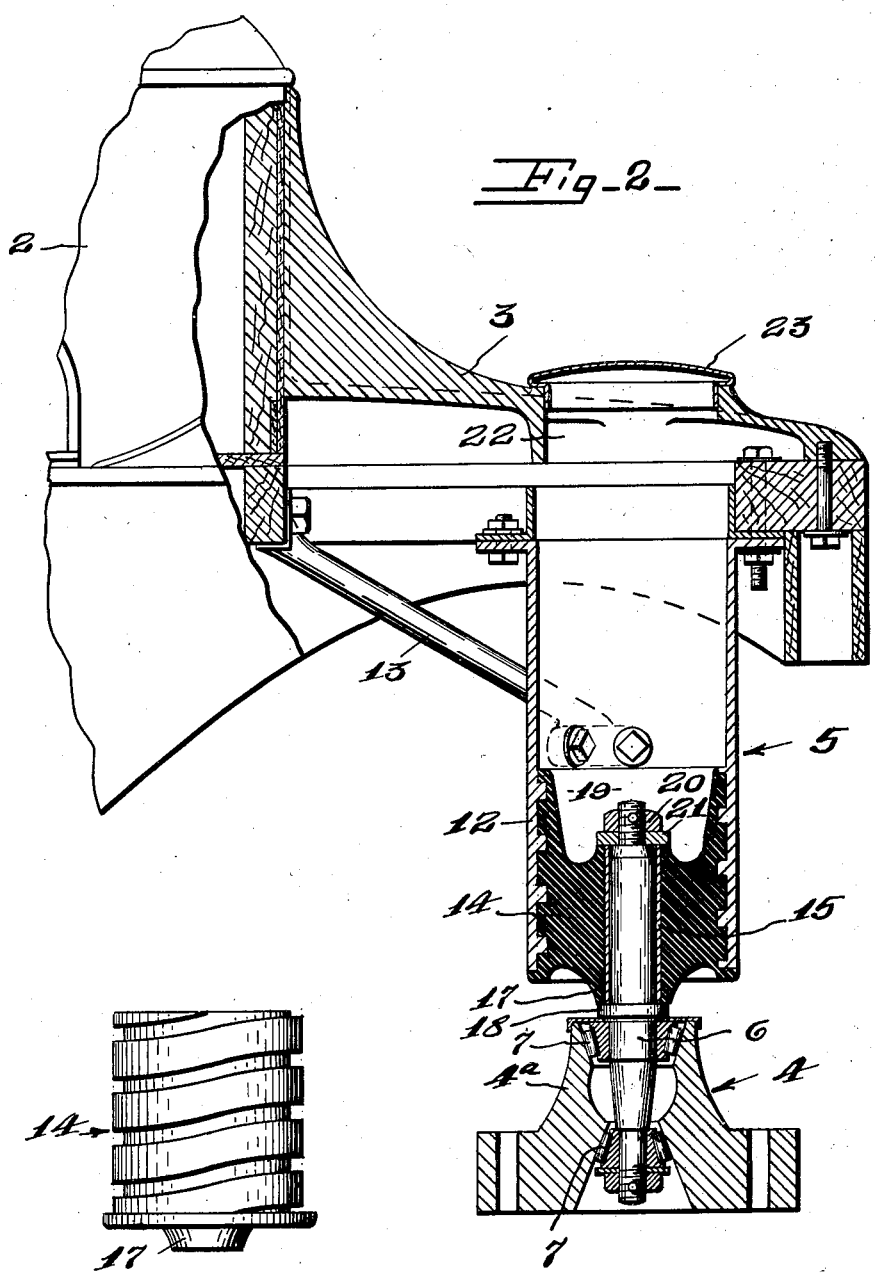

Patented Dec. 4, 1934

1,983,317

UNITED STATES PATENT OFFICE 1,983,317

COUPLING FOR TRAILERS

Jacob A. Seitz, Syracuse, N. Y.

Application March 27, 1933, Serial No. 662,886

8 Claims. (Cl. 280—33.1)

This invention has for its object a swivel or king pin coupling for trailers for motor vehicles, which coupling can readily be applied to the standard power car or motor vehicle so that the trailer may be readily coupled to any standard motor vehicle. It further has for its object a swivel or king pin coupling for trailers which has a yielding universal joint action.

It further has for its object a coupling having a universal joint action in which the universal joint action is through a block of yielding resilient material, as rubber, in which the king pin is anchored.

It further has for its object an arrangement of the coupling relative to the trailer, whereby the king pin is readily accessible for the purpose of demounting or attaching the trailer to the power vehicle.

Other objects appear throughout the specification.

The invention consists in the novel features and in the combinations and constructions hereinafter set forth and claimed.

In describing this invention, reference is had to the accompanying drawings in which like characters designate corresponding parts in all the views.

Figure 2 is an enlarged vertical sectional view through the coupling and the contiguous portion of the trailer.

Figure 3 is a detail view of the rubber block forming the universal joint connection of the coupling.

Figure 1:
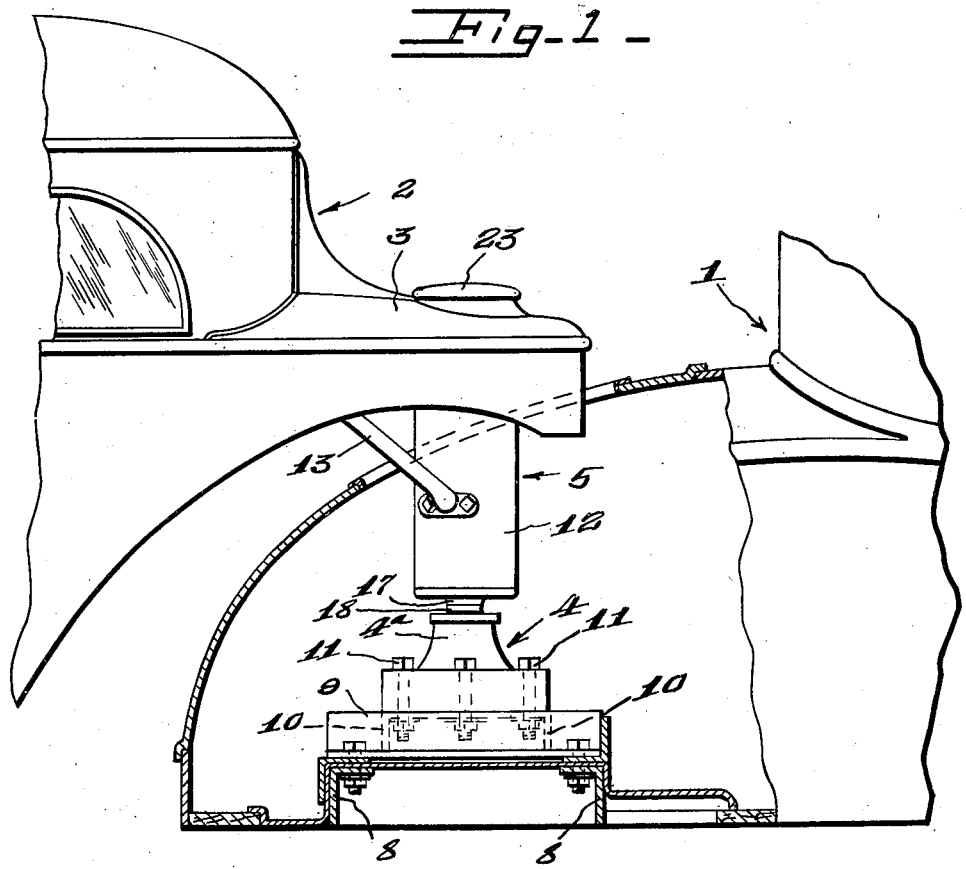
Figure 1 is an elevation of this king pin coupling, the contiguous portion of the trailer and the power car being shown.

This coupling comprises generally lower and upper units attached respectively to the power or tractor car and the trailer, one unit including a swivelly mounted king pin, and the other a part having a yielding universal joint action and a passage for receiving the king pin, this part being preferably a block of rubber vulcanized or otherwise fixedly secured in its mounting. Preferably, the king pin unit is mounted on the power car and extends vertically upward and is swivelly mounted. The universal joint is mounted on the trailer. The lower or king pin unit comprises a base and a king pin mounted in the base, and the upper unit, a hollow member within which the yielding universal joint is mounted, this having a passage for receiving the king pin. Preferably, the king pin unit is mounted on the power car and the universal joint coupling on the trailer in order that the king pin may be rigidly mounted on the power car insofar as radial movement is concerned.

1 designates generally the power car and 2, the trailer, this usually being provided with a forwardly extending, overhanging flange portion or nose 3. 4 designates generally the lower unit which is applied to the power car, and 5 the upper unit which is applied to the nose of the trailer. The lower unit includes a base 4ª and a king pin 6 having swivel bearings 7 in the base so that the king pin is practically the same as the front axle of the automobile, the swivel bearings being the well-known Timken conical bearing. The base is suitably mounted on the cross angle bars 8 usually forming part of the chassis of a regular automobile coupe construction. In mounting the base in position, angle bars 9 between the bars 8 are provided and also additional angle bars 10 extending between the bars 9 to which angle bars 9 and 10, the base 4ª is secured by bolts 11.

The unit 5 which is attached to the nose of the trailer 3 includes a hollow member, as a sleeve 12, secured in any suitable manner to the lower side of the nose 3 to depend therefrom. It is rigidly held from angular movement by suitable instrumentalities, as braces 13. The universal joint in the sleeve 12 for receiving the king pin is preferably a cylindrical block 14 of rubber firmly secured or anchored in the lower end of the sleeve and provided with a passage for receiving the king pin, the passage being usually lined with a metal bushing 15 which snugly fits the king pin without looseness. The block of rubber is usually vulcanized to the sleeve 12 and the bushing 15 and is also additionally anchored to the sleeve by means of interlocking projections and grooves in the block and on the sleeve, these being here shown as in the form of coarse interfitting threads on the inner face of the sleeve and periphery of the rubber block. The sleeve is formed with a central conical portion 17 at its lower end which thrusts against a collar 18 on the king pin and is also formed with a recess 19 in its upper end, the walls of which extend beyond the upper end of the king pin. This construction of the block gives the necessary universal joint movement and sufficient resistance to avoid too much or too easy a movement for a given size block. When the spindle is inserted in the bushing, it is held from displacement by a removable thrust bearing in the upper end of the spindle, this being here shown as a nut 20 threading on the upper end of the king pin against a washer 21, which, in turn, thrusts against the block or the upper end of the bushing 15.

The nose 3 is provided with a passage 22 alined with the sleeve 12, which passage opens through the upper side of the nose and is closed by a removable cap 23. Thus, when it is desired to uncouple the power car from the trailer, the cap 23 is removed, so that the hand can be inserted into the sleeve to remove the nut 20 and washer 21 whereupon the front end of the trailer can be lifted upwardly lifting the block off the king pin. The reverse of this operation takes place when coupling a trailer to a king pin.

In operation, the king pin swivels in its bearings in the base 4ª, as the portion of the king pin in the bushing 15 offers more resistance to swivelling than the bearings. Owing to the rubber block, misalinements of the king pin are permitted due to the resilient universal joint action of the rubber block without transmitting any strains of misalinements to the trailer, and without straining the king pin. Such misalinements between the king pin and the rubber block are constantly taking place while driving on the road and any strains and shocks that would otherwise occur are absorbed by the yielding universal joint action of the rubber block.

What I claim is:

1. A coupling for trailers comprising lower and upper units mounted respectively on the power car and the trailer, the lower unit comprising a base and a king pin having swivel bearings in the base and the upper unit comprising a hollow member having a block of elastic yielding material formed with a passage for receiving the king pin whereby the king pin is connected to the upper unit through a yielding universal joint connection.

2. A coupling for trailers comprising lower and upper units for connection respectively to the power car and the trailer, the lower unit comprising a base and a king pin having swivel bearings in the base, the upper unit comprising a hollow member having a block of rubber at its lower end provided with a central bushing fixed therein for receiving the king pin.

3. A coupling for trailers comprising lower and upper units for connection respectively to the power car and the trailer, the lower unit comprising a base and a king pin having swivel bearings in the base, the upper unit comprising a hollow member having a block of rubber at its lower end provided with a central bushing fixed therein for receiving the king pin, the king pin having a shoulder thrusting against the lower end of the block and the bushing and detachable means at the upper end of the king pin and thrusting against the upper end of the block and the bushing.

4. A coupling for trailers comprising lower and upper units for connection respectively to the power car and the trailer, the lower unit comprising a base and a king pin having swivel bearings in the base, the upper unit comprising a hollow member having a block of rubber at its lower end provided with a central bushing fixed therein for receiving the king pin, the king pin having a shoulder thrusting against the lower end of the block and the bushing and detachable means at the upper end of the king pin and thrusting against the upper end of the block and the bushing, said member having a passage at its upper end and said means being removable and replaceable through said passage.

5. A coupling for trailers comprising lower and upper units mounted respectively on the power car and on the trailer, the lower unit comprising a base and a king pin having swivel bearings in the base and the upper unit including a hollow member having a block of yielding resilient material at its lower end formed with a passage for receiving the king pin, said block being cylindrical in general form and having at its lower end a downwardly extending conical portion and the king pin having a shoulder against which the conical portion thrusts.

6. A coupling for trailers comprising lower and upper units mounted respectively on the power car and on the trailer, the lower unit comprising a base and a king pin having swivel bearings in the base and the upper unit including a hollow member having a block of yielding resilient material at its lower end formed with a passage for receiving the king pin, said block being cylindrical in general form and having at its lower end a downwardly extending conical portion and the king pin having a shoulder against which the conical portion thrusts, the block also having a recess in its upper end, the walls of which extend above the upper end of the king pin.

7. A coupling for trailers comprising lower and upper units, the lower unit comprising a base mounted on the power car and an upwardly extending spindle having swivel bearings in the base and the upper unit comprising a depending vertically extending sleeve having a block of yielding resilient material at its lower end provided with a passage for receiving the king pin, the king pin and said block having coacting thrust bearings at the upper and lower ends of the block, the upper thrust bearing being removable for permitting displacement of the trailer and the trailer having a passage alined with the sleeve for permitting the removal and replacement of the thrust bearing.

8. A coupling for trailers comprising lower and upper units mounted respectively on the power car and the trailer, one unit comprising a base and a king pin having swivel bearings in the base and the other unit comprising a hollow member having a block of elastic yielding material formed with a passage for receiving the king pin, whereby the king pin is connected to the unit, which has the hollow member and block of elastic material, through a yielding universal joint action.

JACOB A. SEITZ.